April 26, 1932. C. H. WIDMAN 1,856,010
BUILT-UP FRONT MEMBER OR SECTION FOR AUTOMOBILE BODIES
Filed May 18, 1931 2 Sheets-Sheet 1
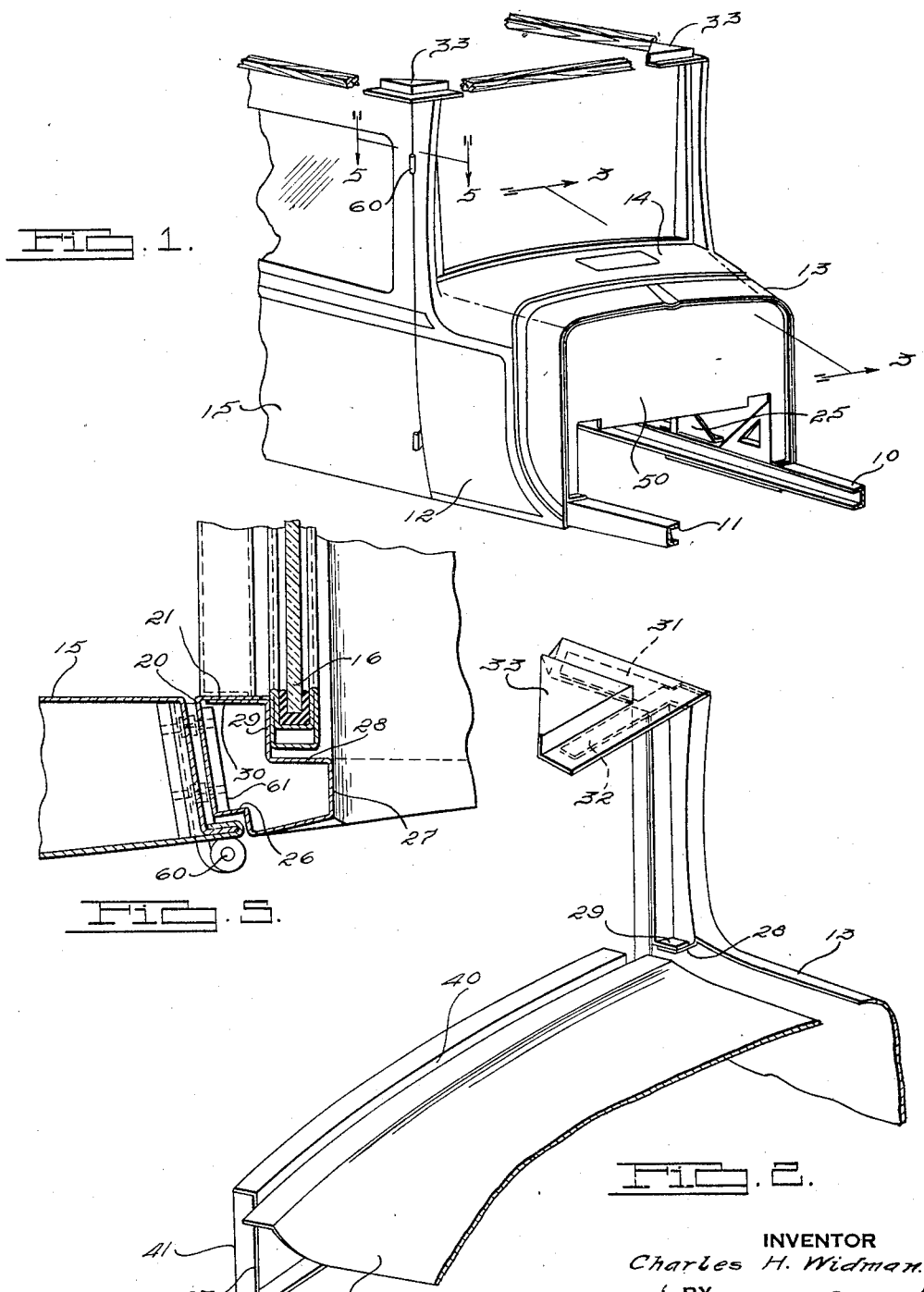
INVENTOR
Charles H. Widman.
BY
Harness, Dickey, Pierce & Mann
ATTORNEYS.

April 26, 1932. C. H. WIDMAN 1,856,010
BUILT-UP FRONT MEMBER OR SECTION FOR AUTOMOBILE BODIES
Filed May 18, 1931 2 Sheets-Sheet 2
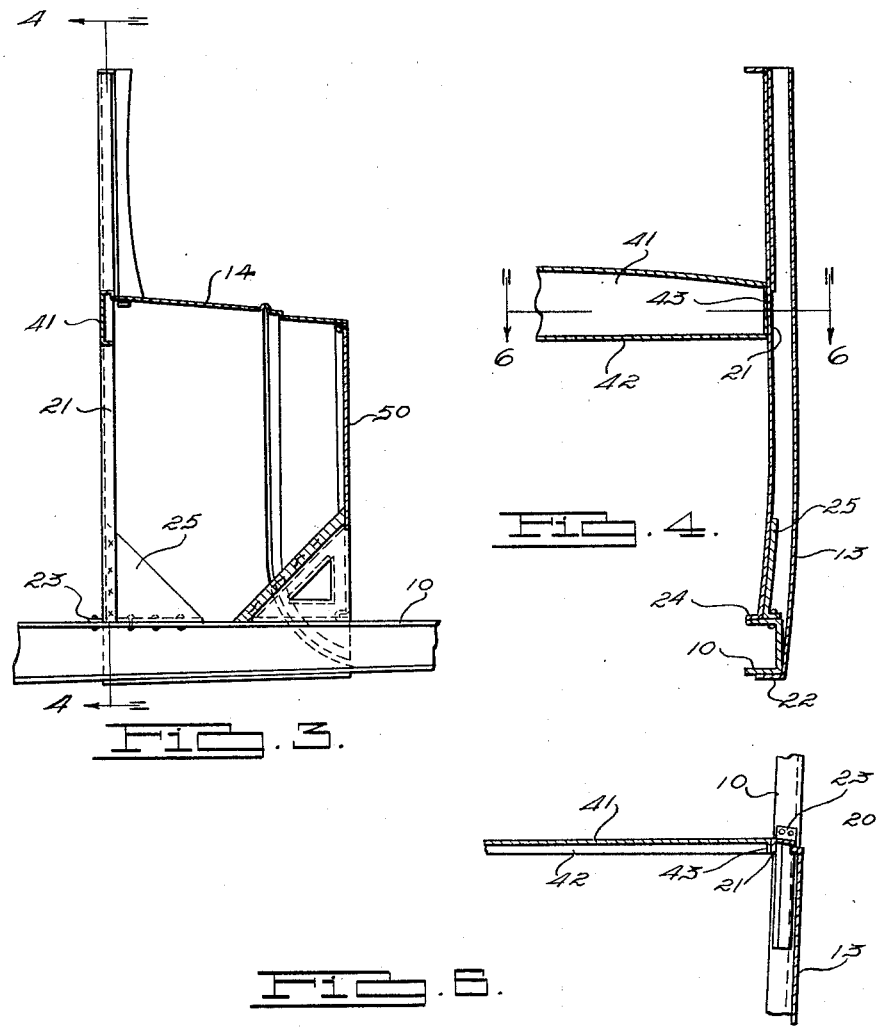
INVENTOR
Charles H. Widman
BY
ATTORNEYS.

Patented Apr. 26, 1932

1,856,010

UNITED STATES PATENT OFFICE

CHARLES H. WIDMAN, OF DETROIT, MICHIGAN, ASSIGNOR TO THE MURRAY CORPORATION OF AMERICA, A CORPORATION OF DELAWARE

BUILT-UP FRONT MEMBER OR SECTION FOR AUTOMOBILE BODIES

Application filed May 18, 1931. Serial No. 538,168.

This invention relates to automobile body construction. The principal object of the invention is to provide a front section of novel construction including the forward roof supporting pillars and windshield frame, for a closed automobile body which eliminates substantially all of the skeleton framing members heretofore used in such construction and utilizes only the material of the finish panels, which are so shaped and joined as to contain within themselves the necessary strength and rigidity heretofore supplied by separate skeleton framing members upon and by which the finish panels were supported.

Another object of the invention is to provide a construction wherein the cowl, the roof supporting pillars, forward door pillars and the windshield frame of the automobile body is comprised entirely of metal stampings made up of the finish paneling of the body.

Another object of the invention is to provide a construction wherein the side cowl panel, the forward door post and roof supporting pillar of the body are entirely formed from the same sheet of metal and constitute a single stamping.

Another object of the invention is to provide a construction wherein each side panel member of the cowl integrally embodies the forward door post and roof supporting pillar which extends upwardly to the roof of the body and forms one side of the framing and support for the windshield and which is made up of a single stamping, and wherein the top panel of the cowl section embodies the instrument panel as well as the top cover panel of the cowl, and which is made up of a single stamping and joined along its edges to the edges of the side panel members of the cowl, the whole constituting the entire cowl, the forward door posts and roof supporting pillars and the windshield frame of the body and comprising three main stampings of similar gauge metal.

With these and other objects in view, my invention consists in the combination, construction and formation of the parts shown in the accompanying drawings, described in the accompanying specification and claimed in the appended claims.

In the drawings—

Fig. 1 is a perspective view of the forward end of an automobile body embodying my invention.

Fig. 2 is a fragmentary perspective view of one of the side members of my front section and the central combined cover and instrument panel, disposed in slightly spaced relation to illustrate the assembly of the separate parts.

Fig. 3 is a vertical sectional view taken on line 3—3 of Fig. 1.

Fig. 4 is a vertical sectional view taken on line 4—4 of Fig. 3.

Fig. 5 is a sectional view taken on line 5—5 of Fig. 1.

Fig. 6 is a sectional view taken on line 6—6 of Fig. 4.

Heretofore, it has been the practice in the construction of the front sections of closed automobile bodies to provide upstanding posts or pillars for the front corners of the passenger section of the body. These posts are fastened at their lower ends to the sills or underframing of the body and extend upwardly along the sides of the forward windshield opening in the body to the roof thereof and form the front roof supports and door posts. Such framing members are usually of wood or of comparatively heavy gauge sheet metal and are suitably secured and braced relative to the sill members or underframing of the body, to constitute a rigid skeleton framing. The paneling for the body is made of a comparatively light gauge sheet metal and is formed of stampings which are fitted around and secured to these framing elements and are presumably supported thereby. Usually also, a heavier gauge member is extended transversely between the intermediate portions of two upright pillars and secured thereto, and is used to support the instrument panel upon which the various dials and motor control instruments are usually located, and also to support the rear edge of the central top finishing panel for the cowl section which defines the lower edge of the windshield opening.

In my improved construction, I eliminate the separate upright framing members and embody the forward door posts and roof supporting pillars, which define the sides of the windshield opening at the front of the body and the forward edges of the front door openings in the body, integrally in the same members that also form the finish panels for the sides of the cowl section.

I also form a cowl side panel and a forward door post and roof pillar in one piece and join and secure together the two cowl sides and forward door posts and roof pillars by another single piece, which constitutes the top or cover section for the cowl and embodies in itself the cross frame member which extends between the cowl side and forward door posts and pillar members and secures and braces them relative to each other forms the top of the cowl section, and also embodies in the same single piece the instrument panel, wherein the various indicators and motor control instruments may be mounted, all of which are made from the sheet metal paneling ordinarily used to sheath the body.

In Fig. 1, the numerals 10 and 11 designate the body sills, which in the view shown are of channel shaped metal but which may be of wood if desired. The numeral 12 indicates the right cowl side member which embodies in its rear vertical edge the forward door post and roof supporting pillar of the body which is extended upwardly to the roof of the body. The numeral 13 indicates the left cowl side member which is identical in construction and formation with the cowl side member 12. The numeral 14 indicates the central member of the assembly which constitutes the cover and cross frame member for the cowl section. The dotted lines in Fig. 1 along each side of the member 14 indicate the lines at which the central member 14 is joined to the side members 12 and 13, preferably by butt welding. All members 12, 13 and 14 are formed of sheet metal of the gauge ordinarily used for automobile body sheathing or paneling, and they are formed by stamping.

Referring now to Fig. 6, it will be noted that the side member 13 is provided at its rear edge with a channel shaped flange 20 which extends inwardly and then forwardly relative to the major axis of the body to constitute the lower portion of the door post and roof supporting pillar. The lower edge of the member 13 as shown in Fig. 4 is provided with an inwardly extending flange 22 which extends beneath and may be secured to the under side of the sill 10. The flanges 20—21 as shown in Fig. 6 are extended upwardly from the sill 10 to the roof of the body. The lower end of flange 20 is turned rearwardly to form a footing flange 23 which is secured to the top of the sill 10, and the lower end of the flange 21, as shown in Fig. 4 is turned inwardly to form a footing flange 24 which is also secured to the top of the sill 10.

An angle shaped bracing member 25 is provided as shown in Fig. 4, having one of its sides secured preferably by spot welding to the inside of the lower portion of the flange 21 and having its other side resting upon and secured to the top of the sill 10.

It will be apparent from the foregoing that the lower portion of the rear edge of the side member 13, and this applies likewise to the side member 12, is formed to provide three sides of the box section structure which is characteristically a strong corner post construction.

Referring to Figs. 2 and 5, the construction and formation of the upper rear edge portion of the side member 13 becomes apparent. The forwardly extending upper edge portion of the side member 13 is rounded and extends inwardly of the body as shown in Fig. 2. The formation of the rear edge portion of the member 13 above the rounded upper edge of the forwardly extending portion is illustrated in the cross section of the corresponding part of the side member 12 shown in Fig. 5. The rear outer corner of the panel is bent to provide an inset rabbet 26, which extends the full length of the post from the roof to the sill of the body, forms a countersunk nest for the overlapping flange on the forward edge of the door 15 and increases the strength of the post. From this rabbet the metal is extended forwardly and then turned inwardly at 27, then rearwardly at 28, then inwardly again at 29 to form a rabbet for receiving the side edge of the windshield 16. The metal is then turned rearwardly at 30 and underlaps and is secured to the flange 21, thus forming a closed box section structure along the side of the windshield opening and also providing a rabbet for receiving the side edges of the windshield and its frame, which can be mounted to swing outwardly and forwardly or to slide vertically, as desired.

The flange 20 at its upper end may be extended rearwardly to provide a horizontal flange 31, and the flange 21 may be extended at its upper end to provide an inwardly extending flange 32 upon which may be secured, by welding or other suitable means, a triangular bracket 33 for supporting the roof rail and windshield header members of the body. At the lower corners of the windshield supporting rabbets of the side members 12 and 13, as shown in Fig. 2, the lower ends of the flanges 28 are bent inwardly toward the major axis of the body and the lower ends of the flanges 29 are bent forwardly to overlie the inwardly bent portions of the flanges 28 and they may be secured together by spot welding or other suitable means. This forms a shelf at the lower end of the rabbet the function of which will be hereinafter explained.

The central member 14 is as before stated formed as a stamping from a single piece of sheet metal, its rear edge, as shown in Fig. 2, is provided with a forwardly presenting rabbet 40, which receives the lower edge of the windshield frame and provides an abutment and stop therefor. The metal of the panel is then extended rearwardly and downwardly to form a depending instrument panel 41 which is positioned interiorly of the body the body end faces the front seat just below the windshield opening. The lower edge of the instrument panel portion 41 is flanged forwardly at 42 to provide a finished appearance and the ends are flanged forwardly at 43, and these flanges 43 mate with and are secured to the forwardly extending flanges 21 provided on the rear inner edges of the members 12 and 13, as shown more clearly in Figs. 4 and 6. The flanges 43 on the instrument panel are offset inwardly from the forwardly extending side edges of the member 14, as shown in Fig. 2, and these projecting corners of the member 14 rest upon the shelves formed by the horizontally turned lower ends of the flanges 28 and 29 and are secured thereto by welding or other suitable means. The side edges of the member 14 are secured preferably by butt welding to the upper inwardly presented edges of the forwardly extending portions of the members 12 and 13. The members 12, 13 and 14 are each formed of a single metal stamping of the sheet metal normally used to form the paneling or sheathing for bodies. They may be rapidly and economically formed, especially in large production. The three parts may be very easily assembled and secured together to form a unit which may be applied to the sills or underframing of the body. If desired, a sheet metal dash panel 50 is illustrated in Figures 1 and 3, may be formed and attached by welding or other suitable means to the forward ends of the side members 12 and 13 and the central member 14, thus providing a complete unitary forward section for the body.

As shown in Fig. 5 the hinges 60 for the forward doors may be secured to the posts by securing one wing to a reinforcing plate 61 positioned against the inner side of the flange 20 of the post.

I have by my construction succeeded in eliminating the necessity for separate skeleton framing members and the consequent material and labor costs attendant upon their use and I have also by the elimination of these skeleton framing members reduced the total weight of the body to a material extent.

Formal changes may be made in the specific embodiment of the invention described without departing from the spirit and substance of the broad invention, the scope of which is commensurate with the appended claims.

I claim:

1. A front section for a closed vehicle body consisting entirely of sheet metal stampings and comprising a pair of side cowl members each forming a side of the cowl section and each formed of a single stamping, the rear vertical edge portion of each of said side cowl members being bent to form a forward door post and roof supporting pillar of hollow box cross section, each of said posts being entirely closed above the forwardly extending portion of the side member and having its opposite edges secured together, and each being provided with a rabbet for receiving the sides of a windshield frame, a cross member forming the cowl cover member and comprising a single stamping extending between and secured to the upper edges of the forwardly extending portions of the side members and provided with a depending rear portion extending downwardly between and secured at its side edges to the posts of said side members.

2. A front section for a closed vehicle body consisting entirely of sheet metal stampings and comprising a pair of side cowl members each forming a side of the cowl section and each formed of a single stamping, the rear vertical edge portion of each of said side cowl members being bent to form a forward door post and roof supporting pillar of hollow box cross section, each of said posts being entirely closed above the forwardly extending portion of the side member and having its opposite edges secured together, and each being provided with a rabbet for receiving the sides of a windshield frame, a cross member forming the cowl cover member comprising a single stamping extending between and secured to the top edges of the forwardly extending portions of the side members and provided at its rear portion with a forwardly presenting rabbet extending between the lower ends of the windshield receiving rabbets in the posts and also with a depending portion extending downwardly between and secured at its side edges to the posts of said side members and forming an instrument panel.

3. A front section for a closed vehicle body consisting entirely of sheet metal stampings and comprising a pair of side cowl members each forming a side of the cowl section and each formed of a single stamping, the rear vertical edge portion of each of said side cowl members being bent to form a forward door post of hollow box cross section, each of said posts being entirely closed above the forwardly extending portion of the side member and having its opposite edges secured together, and each being provided along its forward inner corner with a windshield receiving rabbet, and each being provided along its rear outer corner with a door receiving rabbet, a cross member forming the cowl cover member and comprising a single stamping extending between and secured to the upper edges of the forwardly extending portions of the side members.

4. A front section for a closed vehicle body consisting entirely of sheet metal stampings and comprising a pair of side cowl members each forming a side of the cowl section and each formed of a single stamping, the rear vertical edge portion of each of said side cowl members being bent to form a forward door post of hollow box cross section, each of said posts being entirely closed above the forwardly extending portion of the side member and having its opposite edges secured together, and each being provided along its forward inner corner with an inset forwardly presenting windshield receiving rabbet with the lower ends of the flanges forming said rabbet turned horizontally and secured in super-imposed relation to one another, a cross member forming the cowl cover member and comprising a single stamping extending between and secured to the upper edges of the forwardly extending portions of the side members, the rear side portions of said cover member being formed with corners which rest upon and are secured to the horizontally disposed ends of the windshield rabbet flanges of the corner post portions of said side cowl members.

5. A front section for a closed vehicle body consisting entirely of sheet metal stampings and comprising a pair of side cowl members each forming a side of the cowl section and each formed of a single stamping, the rear vertical edge portion of each of said side cowl members being bent to form a door post of hollow box cross section, each of said posts being entirely closed above the forwardly extending portion of the side member and having its opposite edges secured together, a cross member forming the cowl cover member and comprising a single stamping extending between and secured to the upper edges of the side members, the rear portion of said cover member being provided with a depending instrument panel portion fitting between the post portions of said side members and having laterally turned flanges at its ends mating with and secured to the inner side flanges of said post portions.

6. A front section for a closed vehicle body consisting entirely of sheet metal stampings and comprising a pair of side cowl members each forming a side of the cowl section and each formed of a single stamping, the rear vertical edge portion of said side cowl members being bent to form a door post of hollow box cross section, each of said posts being entirely closed above the forwardly extending portion of the side member and having its opposite edges secured together, a cross member forming the cowl cover member and comprising a single stamping extending between and secured to the upper edges of the forwardly extending members.

CHARLES H. WIDMAN.